United States Patent [19]

McKeown

[11] 4,416,993
[45] Nov. 22, 1983

[54] APPARATUS WITH SEMI-PERMEABLE MEMBRANE, AND METHOD FOR CULTIVATING MICRO-ORGANISMS

[75] Inventor: John B. McKeown, Bothwell, Scotland

[73] Assignee: McLeod & Miller (Engineers) Limited, Glasgow, Scotland

[21] Appl. No.: 272,547

[22] Filed: Jun. 11, 1981

[51] Int. Cl.$^3$ .............................................. C12N 1/00
[52] U.S. Cl. ................................... 435/243; 210/150; 210/151; 210/611; 210/615; 210/620; 435/311; 435/313; 435/813
[58] Field of Search ............... 435/243, 296, 311, 313, 435/813; 210/150, 151, 611, 615, 620

[56] References Cited

U.S. PATENT DOCUMENTS

| | | | |
|---|---|---|---|
| 3,186,917 | 6/1965 | Gerhardt | 435/813 |
| 3,269,542 | 8/1966 | Renzi | 210/615 X |
| 3,301,401 | 1/1967 | Hall | 210/150 |
| 3,732,160 | 5/1973 | Klock | 210/150 X |
| 4,141,823 | 2/1979 | Smith | 210/150 X |
| 4,165,281 | 8/1979 | Kuriyama | 210/150 X |

FOREIGN PATENT DOCUMENTS

| | | |
|---|---|---|
| 1389412 | 4/1975 | United Kingdom . |
| 1450839 | 9/1976 | United Kingdom . |
| 1450840 | 9/1976 | United Kingdom . |

*Primary Examiner*—Sidney Marantz
*Attorney, Agent, or Firm*—Gerald J. Ferguson, Jr.; Joseph J. Baker

[57] ABSTRACT

Apparatus for and method of cultivating micro-organisms.

The apparatus includes a tank 10 in which the cultivation medium flows, for example sewage or trade effluent to be treated. Within the tank are hollow plates 11 into which flows an oxygenating gas. The plates have walls of gas-permeable material to the outer face of which the micro organisms adhere. Air or oxygen within the plates pass through the wall and through the layer of micro organisms, to provide an aerobic biomass 20 (FIG. 3). This biomass is thicker or more active than the aerobic layer 21 of apparatus where the biomass is acted upon only from the outer faces such as in fuller beds (FIG. 1) or rotary discs (FIG. 2).

Tubes or troughs may be used instead of plates; the tubes may be upright or horizontal with the air or oxygen passing therethrough. The troughs may be open topped.

The plate, tube or trough consists of a frame 14, a net 15 mounted on the frame and supporting the gas-permeable walls, which may be of micro porous material 16.

9 Claims, 12 Drawing Figures

APPARATUS WITH SEMI-PERMEABLE MEMBRANE, AND METHOD FOR CULTIVATING MICRO-ORGANISMS

This invention relates to apparatus for and a method of cultivating micro-organisms and is particularly but not exclusively for the biological removal of organic material from liquids, such as the removal of pollutants from sewage and trade effluent.

Two known forms of apparatus for sewage treatment are biological or percolating filters, and rotary biological discs. The filters include beds of stones or plastics media which provide a relatively large surface area (relative to the volume of the filter) on which a biomass can grow, and the discs also provide a relatively large surface area and build up a layer of biomass as they rotate their lower halves through the liquid to be treated.

Figure 1:
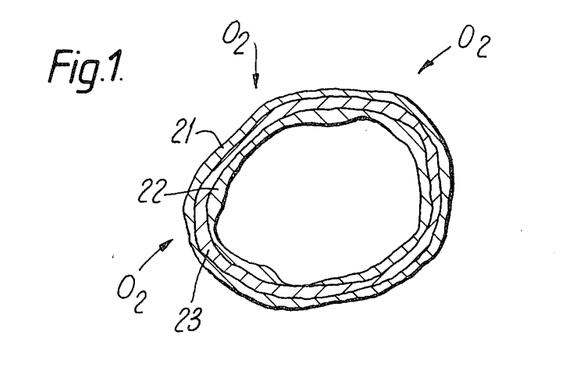
FIGS. 1 and 2 illustrate a stone and a portion of a disc, respectively.
Figure 2:
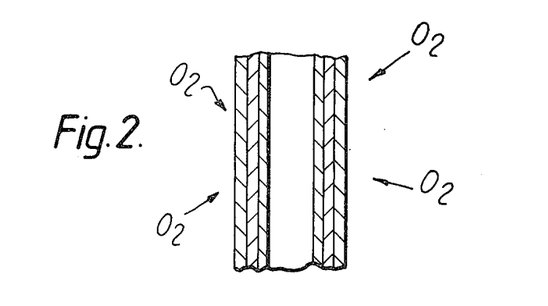

FIGS. 1 and 2 illustrate a stone and a portion of a disc respectively and show a biomass 21 to 23 on each, there being an outer layer 21 of effective aerobic material, an inner layer 22 of anaerobic and a central layer 23 which is partly aerobic and partly anaerobic.

A disadvantage of the known processes is that the inner depth of the biomass is anaerobic and the effective aerobic layer of biomass is extremely thin; hence, the need for relatively large surface areas.

It is an object of this invention to provide apparatus in which the layer of effective aerobic biomass is increased in thickness or is more active.

According to one aspect of the present invention there is provided apparatus for the cultivation of micro-organisms comprising a container, a gas-permeable support member within the container and forming therewith a first zone for holding cultivation medium and a second zone for oxygenating gas, whereby micro-organisms cultured in the first zone adhere to the adjacent surface of the support and oxygenating gas passes from the second zone through the support and the adherent micro-organisms.

According to another aspect of the present invention, there is provided a method of cultivating micro-organisms comprising the steps of permitting a culture to adhere to and grow upon one face of a gas permeable support to form a biomass thereon and passing oxygenating gas through the support from the opposite side and through the adherent biomass thereby to culturate an aerobic biomass on the support.

According to a further aspect of the present invention there is provided apparatus for the biological removal of organic material from liquids, comprising a container through which liquid to be treated is passed and in which is located one or more support members on each of which a layer of biomass grows, the or each member being of a gas permeable material and so formed that only one face of the material is in contact with the liquid to be treated, the other face being in contact with a source of air or oxygen.

BRIEF DESCRIPTION OF THE DRAWINGS

Embodiments of the present invention will now be described, by way of example, with reference to the accompanying drawings, in which.

The apparatus is particularly useful for the biological removal of organic material from liquids, such as the removal of pollutants from sewage and trade effluent.

Figure 4:
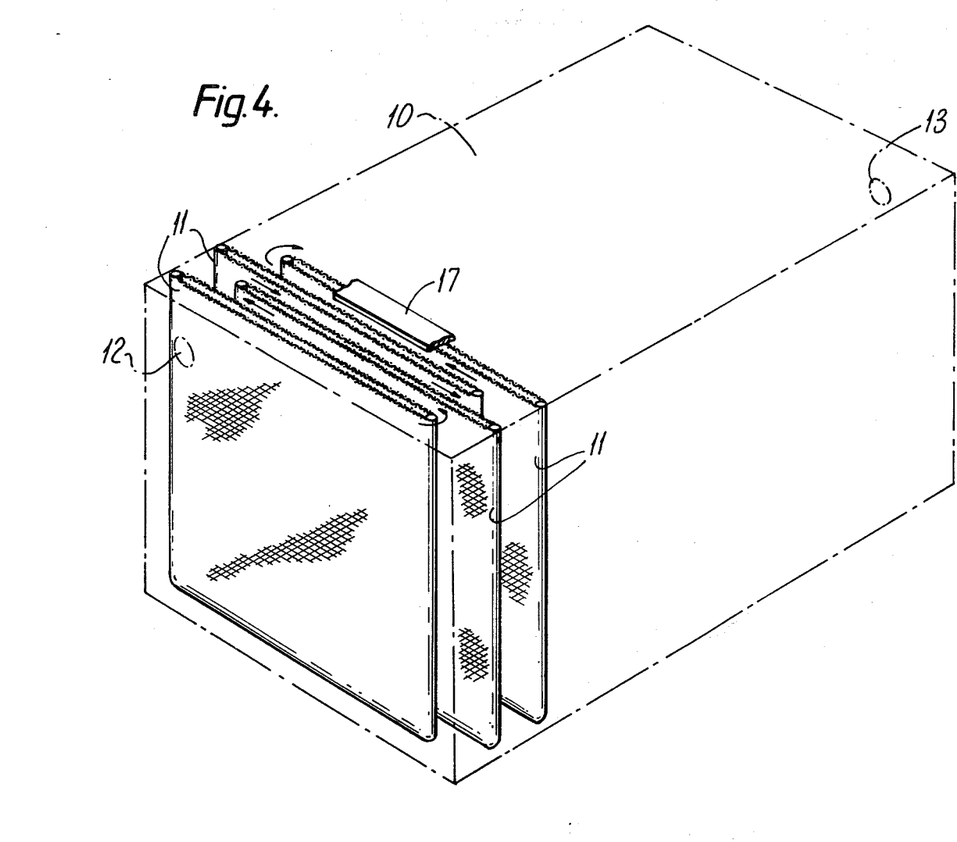
FIG. 4 illustrates apparatus according to one embodiment of the present invention.
Figure 5:
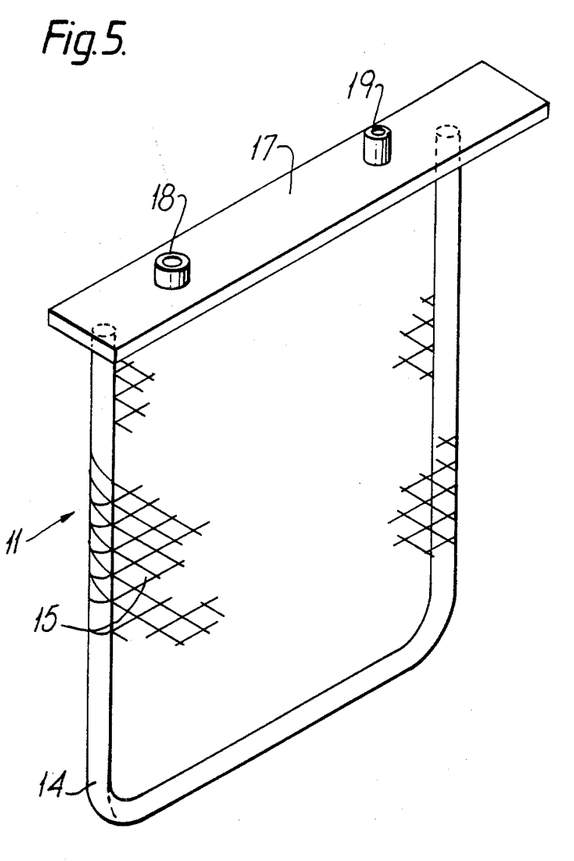
FIG. 5 illustrates a plate for use in the apparatus of FIG. 4.

Referring firstly to FIGS. 4 and 5, one embodiment of the apparatus comprises a tank 10 into which depend a plurality of support members in the form of hollow plates 11, alternate plates being displaced transversely so as to provide a zig-zag flow path for the sewage to be treated. The sewage enters the tank as one end 12 and exits at the longitudinally opposite end 13. The interior of the tank not occupied by the plates forms a zone for the cultivated medium, i.e. the sewage.

Each plate 11 is formed as illustrated in FIG. 5; a U-shaped frame 14 carries a sleeve of netting 15 and the combined frame and netting support a covering of gas permeable material, for example a micro-porous material 16 (FIG. 3), such as a PTFE material laminated to a woven nylon fabric. The micro-porous material prevents liquid passing through its walls to the interior, but permitting air or oxygen to pass through the walls from the interior, such a material is sold under the Trade Mark GOTETEX. The netting may be of the kind sold under the registered Trade Mark NETLON.

The upper end of each plate 11 is closed by an overlapping strip 17 which has an inlet 18 and outlet 19 for air or oxygen to flow within the plate thus providing a zone for oxygenating gas.

The air or oxygen may be induced to flow within the plate by any suitable means; for example, from a pressurized bottle, or by a pump which either pumps the medium into the plate or extracts it by a vacuum system. Solar energy may also be used to induce convection flow.

An aerobic biomass 20 (FIG. 3), i.e. micro-organisms cultivated in the cultivation zone, forms on the external wall of the plates and is fed by the air/oxygen passing through the plates, as well as by oxygen if any in the liquid being treated. This liquid may be aerated to increase its oxygen level.

As a result of the plate formations, which permit air/oxygen to act on the biomass layer from both inner and outer faces thereof, the resulting effective aerobic biomass layer 20 will be thicker or more active than one (21) which is acted upon only from the outer face, as illustrated in FIGS. 1 and 2.

Figure 3:
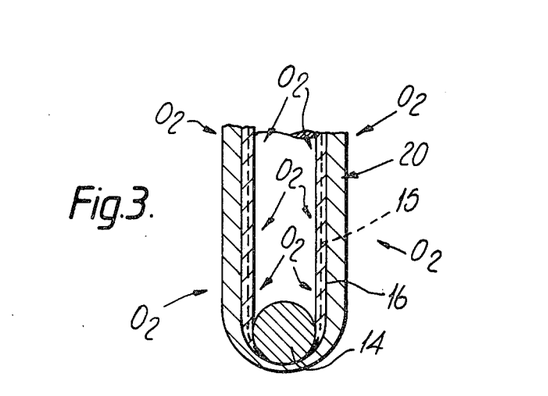
FIG. 3 illustrates in section a member according to the invention with a biomass thereon.

FIG. 3 illustrates the biomass layer produced in accordance with the invention shown as a solid aerobic mass 20.

In a second embodiment (FIGS. 6 to 8), the member is a plate 30 which includes a U-shaped frame 31 of which the limbs 32 are horizontal and connected to a hollow upright, mounting 33 the upper end 34 of which is hook-shaped to engage the side wall of a tank 35. The frame is covered by netting 36 over which is mounted the microporous material (not shown). The hollow mounting 33 has inlets and outlets 37, 38 by which air or oxygen can flow within the plate.

Figure 6:
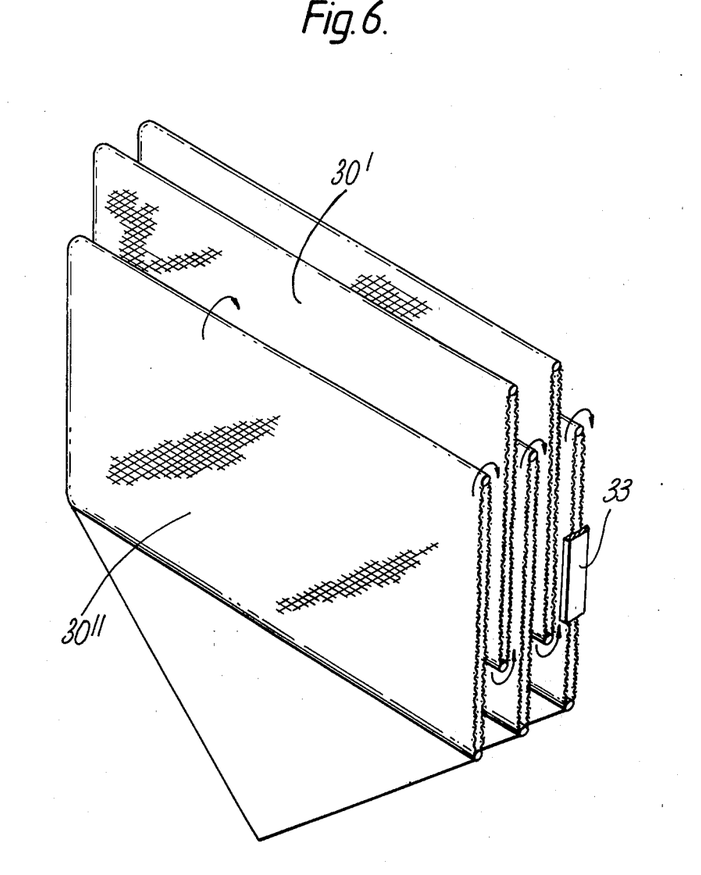
FIG. 6 illustrates plates arranged in accordance with a second embodiment.
Figure 7:
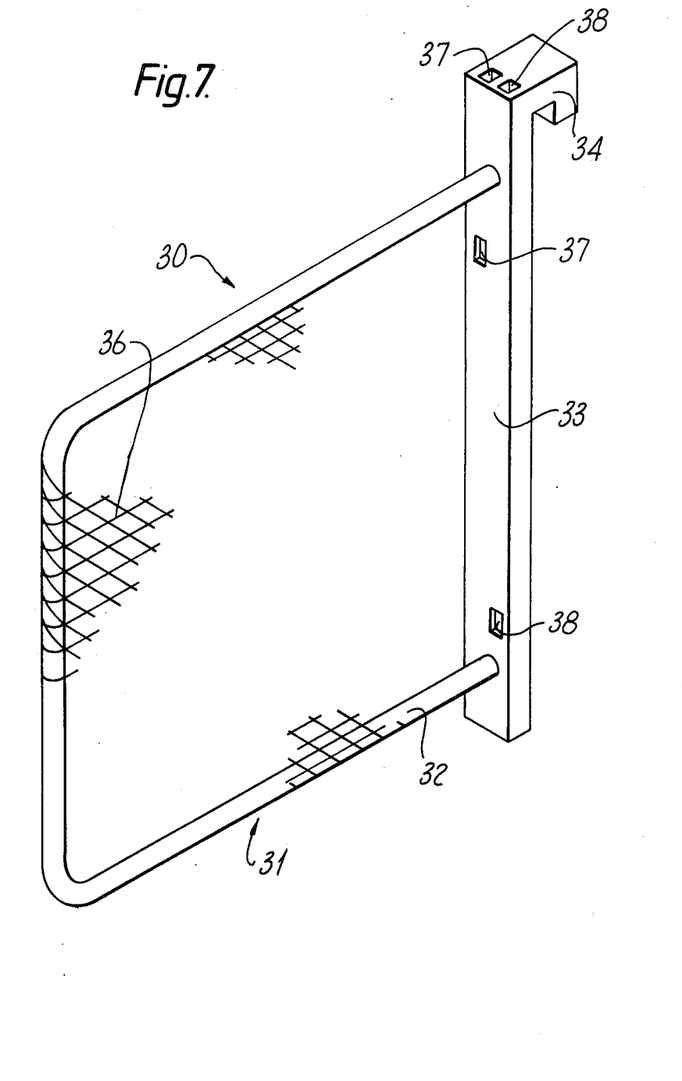
FIG. 7 illustrates the plate of FIG. 6.

Two sets of plates 30', 30" are provided, one set 30' being mounted nearer to the upper end of the mounting than the other set 30"; thus, the plates can be arranged in the tank as illustrated in FIG. 6, so that sewage to be treated passes over the lowered plates 30" and under the raised plates 30'. A baffle 39 is provided on the lowered plates to prevent the flow passing directly under the array of plates.

Figure 8:
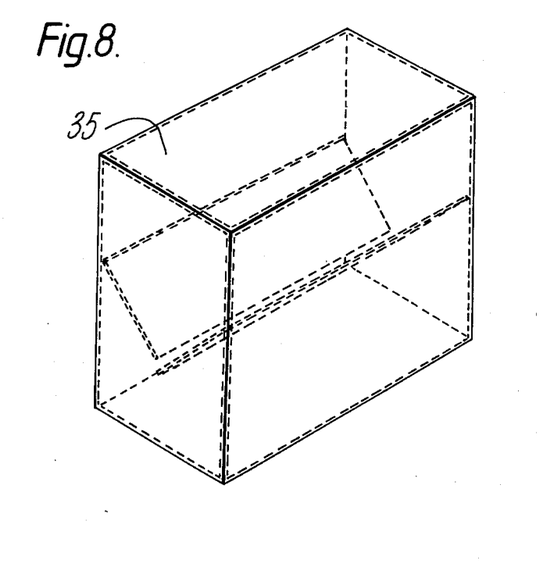
FIG. 8 illustrates a tank for the plates of FIG. 6.

The plates as described in this embodiment may be usefully provided in a tank 35 of the combined settlement and bio-treatment type.

Baffles may be provided in the tanks of the embodiments hereinbefore described for the usual purpose of increasing the distance travelled by the liquid to be treated, regulating the velocity of the liquid and possibly to aid shedding of biomass by virtue of increased velocity. In addition, turbulence increases the availability of organic matter to the biomass.

In a third embodiment (FIGS. 9 to 12), the support member is a plate 40 which includes a frame 41 within which a series of baffles 42 are located; these extend from one or other of two opposed sides of the frame and terminate short of the respective opposite sides to form a zig-zag path for the air/oxygen flow. The frame is covered in netting and with micro-porous material (not shown). Air/oxygen is passed into the interior of the plate at one end of the baffles and exits from the other end, as indicated by arrows in FIG. 9.

Figure 9:
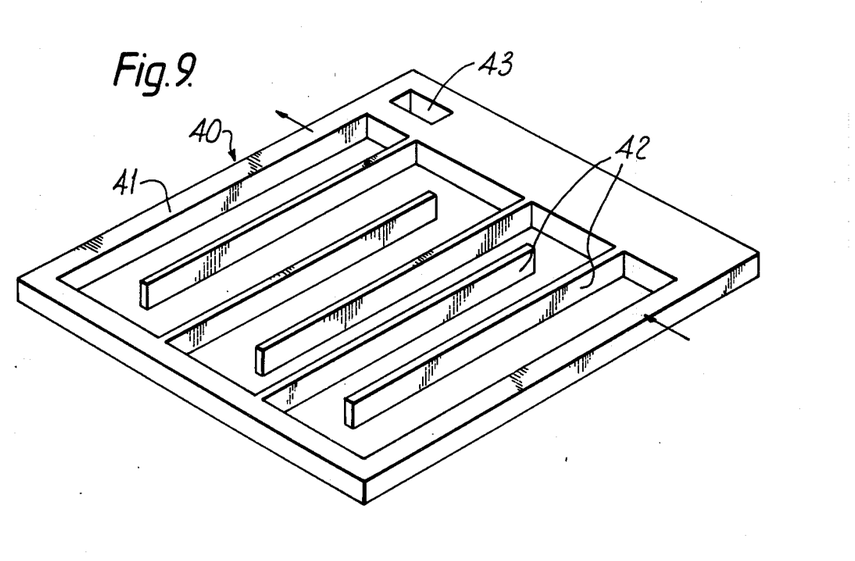
FIG. 9 illustrates a plate for use in a third embodiment of the invention.
Figure 10:
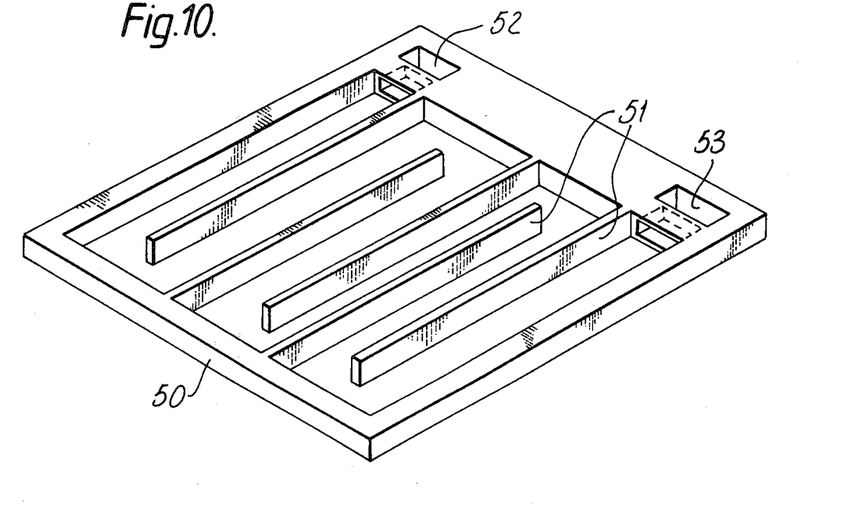
FIG. 10 is a frame for use in conjunction with the plate of FIG. 9.

A second frame 50 is also provided and has the same general shape as the frame 41; also it has similar baffles 51 but it is not covered by netting and micro-porous material. This second frame 50 has an inlet 52 and outlet 53 by which sewage to be treated passes into and out of the baffled area of the frame, and the plate 40 has one aperture 43 which registers with one or other of the inlet or outlet 52, 53 to permit passage of the sewage therethrough, i.e. through aperture 43.

Figure 11:
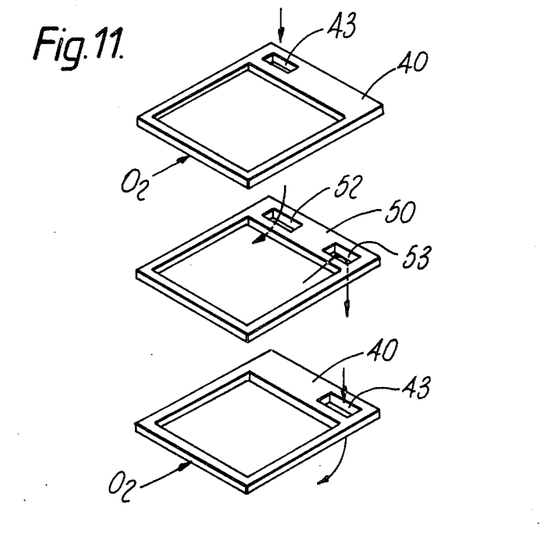
FIG. 11 illustrates the use of the plate and frame of FIGS. 9 and 10.

In use, plates 40 and frames 50 are stacked alternately into a column, the plates and frames lying horizontally. Each alternate plate 40 is reversed, so that the aperture 43 of one plate lies above the inlet 52 of a frame and the aperture of another plate lies below the outlet of that frame as illustrated in FIG. 11. The sewage is fed in a cascading fashion through each of the frames which air/oxygen is fed into each plate.

Figure 12:
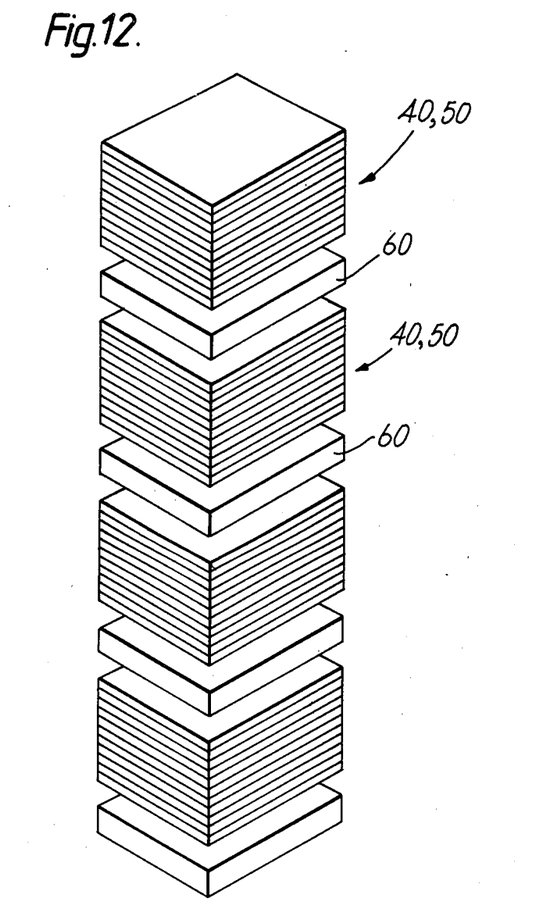
FIG. 12 illustrates the apparatus of the third embodiment.

Groups of stacked plates and frames can be spaced from an adjacent or subjacent group by a spacer 60.

In each of the apparatuses described in the three embodiments, action of the air or oxygen within the plates encourages a relatively thick or more active aerobic growth on the outer faces of the microporous material of each plate. Thus a relatively thicker or more active layer of aerobic growth is produced on a relatively smaller surface area than in known apparatus. Apart from the use of pumps to induce air/oxygen flow, there are no moving parts.

An important advantage of the apparatus and method as hereinbefore described in that the organic matter to be destroyed and the air or oxygen which the organisms in the biomass use to effect this destruction enter the biomass from opposite sides, thus ensuring a maximum availability of both to the organisms.

The apparatus as hereinbefore described can be combined with other plant for biological processes, chemical processes and physical processes. In addition, the plates could be used in overloaded plants.

Other embodiments of apparatus in accordance with the invention can include the use of tubes or troughs wherein a framework supports the micro-porous material and air or oxygen flows in or through the tubes or troughs while the sewage to be treated flows around the tubes or troughs.

While the apparatus is primarily intended for treatment of sewage and trade effluent it is also applicable to the growth and harvesting of specific types (strains) of biomass and in the production of useful chemical products which are produced by aerobic fermentation of micro-organism, for example antibiotics.

I claim:

1. Apparatus for cultivation of micro-organisms comprising a first vessel capable of holding liquid a second vessel having semi-permeable walls which permit the passage of gas but not liquid, extending into the first vessel and providing therein an outwardly facing surface upon which a micro-organism can be cultivated, and means for delivering gas into the second vessel such that the gas can pass through the semi-permeable walls into the first vessel.

2. A method of cultivating micro-organisms in the apparatus claimed in claim 1 comprising placing a nutrient medium in the first vessel, inoculating the medium with a micro-organism, supplying a gas under pressure to the second vessel thereby facilitating cultivation of a culture of micro-organisms on an outwardly facing surface of the second vessel.

3. Apparatus as claimed in claim 1, in which a plurality of second vessels are located in the first vessel in spaced parallel formation.

4. Apparatus as claimed in claim 3 in which the adjacent second vessels are offset to provide a zig-zag flow path.

5. Apparatus as claimed in claim 1 in which the second vessel has a substantially planar configuration.

6. Apparatus as claimed in claim 5 wherein the second vessel comprises a frame which provides support for at least one layer of a micro-porous material.

7. Apparatus as claimed in claim 6 wherein the frame is a substantially rectangular shape and is enveloped by the micro-porous membrane thereby providing two opposed walls on the outer surfaces of which a micro-organism can be cultivated.

8. Apparatus for the biological removal of organic material from liquids, comprising a vessel through which the liquid to be treated can be passed, at least one hollow biomass-support body located in said vessel on the exterior of which body a layer of biomass can be cultivated, the hollow support body having at least one surface formed from a semi-permeable material which permits the passage of gas but not liquid, and means for supplying the hollow support body with a gas such that the gas passes from the interior of the body through the semi-permeable material and into the vessel.

9. Apparatus according to claim 8 wherein a plurality of hollow biomass support bodies are provided in vertically staggered parallel relationship with the vessel so as to provide a zig-zag liquid flow path therein.

* * * * *